United States Patent
Han et al.

(10) Patent No.: US 10,547,623 B1
(45) Date of Patent: Jan. 28, 2020

(54) SECURITY NETWORK DEVICES BY FORECASTING FUTURE SECURITY INCIDENTS FOR A NETWORK BASED ON PAST SECURITY INCIDENTS

(71) Applicant: SYMANTEC CORPORATION, Mountain View, CA (US)

(72) Inventors: Yufei Han, Antibes (FR); Yun Shen, Bristol (GB); Leylya Yumer, Antibes (FR); Pierre-Antoine Vervier, Cagnes-sur-Mer (FR); Petros Efstathopoulos, Los Angeles, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 192 days.

(21) Appl. No.: 15/664,029

(22) Filed: Jul. 31, 2017

(51) Int. Cl.
*G06F 21/31* (2013.01)
*H04L 29/06* (2006.01)

(52) U.S. Cl.
CPC ...... *H04L 63/1408* (2013.01); *H04L 63/1433* (2013.01); *H04L 63/145* (2013.01)

(58) Field of Classification Search
None
See application file for complete search history.

(56) References Cited

U.S. PATENT DOCUMENTS

| | | | |
|---|---|---|---|
| 2011/0302653 A1* | 12/2011 | Frantz | G06F 21/552 726/22 |
| 2014/0223462 A1* | 8/2014 | Aimone | A61B 5/0476 725/10 |
| 2017/0103194 A1* | 4/2017 | Wechsler | G06F 21/316 |

OTHER PUBLICATIONS

U.S. Appl. No. 15/254,748 filed Sep. 1, 2016 (54 pgs).
U.S. Appl. No. 62/341,512, filed May 25, 2016 (19 pgs).
Yang Liu, Armin Sarabi, Jing Zhang, Parinaz Naghizadeh, Manish Karir, Michael Bailey, and Mingyan Liu. 2015. Cloudy with a chance of breach: forecasting cyber security incidents. In Proceedings of the 24th USENIX Conference on Security Symposium (SEC'15), Jaeyeon Jung (Ed.). USENIX Association, Berkeley, CA, USA, 1009-1024.
C. Sabottke, O. Suciu, and T. Dumitraş, "Vulnerability disclosure in the age of social media: Exploiting Twitter for predicting real-world exploits," in USENIX Security Symposium (USENIX Security), Washington, DC, 2015.

(Continued)

*Primary Examiner* — Brandon S Hoffman
(74) *Attorney, Agent, or Firm* — Maschoff Brennan

(57) ABSTRACT

Securing network devices by forecasting future security incidents for a network based on past security incidents. In one embodiment, a method may include constructing past inside-in security features for a network, constructing past outside-in security features for the network, and employing dynamic time warping to generate a similarity score for each security feature pair in the past inside-in security features, in the past outside-in security features, and between the past inside-in security features and the past outside-in security features. The method may further include generating a Coupled Gaussian Latent Variable (CGLV) model based on the similarity scores, forecasting future inside-in security features for the network using the CGLV model, and performing a security action on one or more network devices of the network based on the forecasted future inside-in security features for the network.

20 Claims, 4 Drawing Sheets

(56) References Cited

OTHER PUBLICATIONS

Liu et al. IWSPA'15] Yang Liu, Jing Zhang, Armin Sarabi, Mingyan Liu, Manish Karir, and Michael Bailey. Predicting Cyber Security Incidents Using Feature-Based Characterization of Network-Level Malicious Activities. In Proceedings of the 2015 ACM International Workshop on International Workshop on Security and Privacy Analytics (IWSPA '15).

* cited by examiner

SECURITY NETWORK DEVICES BY
FORECASTING FUTURE SECURITY
INCIDENTS FOR A NETWORK BASED ON
PAST SECURITY INCIDENTS

BACKGROUND

Many modern organizations employ security applications to deal with security issues on an organizational and technical level. For example, security applications may be employed to supervise, among other things, the organization's network and network devices to monitor for, investigate, and defend against potential security incidents. For example, a security application may be tasked with monitoring network devices and then alerting network administrators each time that a network device is threatened, such as by a virus or by malware.

Unfortunately, however, the task of monitoring a network for every potential security incident can be very difficult in modern network environments. This difficulty may arise due to the relatively high number of network devices on modern networks and the relatively high number of potentially threatening circumstances that may arise during any given time period on the network devices. Further, while it may be important for an organization to predict the likelihood of suffering future security incidents on its network, such predicting may be very difficult to accurately perform. When an organization is unable to accurately predict future security incidents on its network, it may be difficult to plan for and mitigate against future security incidents, thereby exposing its network to costly damage.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for securing network devices by forecasting future security incidents for a network based on past security incidents may be performed, at least in part, by a computing device including at least one processor. The method may include constructing past inside-in security features for a network, constructing past outside-in security features for the network, and employing dynamic time warping to generate a similarity score for each security feature pair in the past inside-in security features, in the past outside-in security features, and between the past inside-in security features and the past outside-in security features. The method may further include generating a Coupled Gaussian Latent Variable (CGLV) model based on the similarity scores, forecasting future inside-in security features for the network using the CGLV model, and performing a security action on one or more network devices of the network based on the forecasted future inside-in security features for the network.

In some embodiments, the constructing of the past inside-in security features for the network may be accomplished by monitoring network activity from inside the network and the constructing of the past outside-in security features for the network may be accomplished by monitoring network activity from outside the network.

Also, in some embodiments, the forecasting of the future inside-in security features for the network using the CGLV model may further include forecasting future outside-in security features for the network using the CGLV model. In some embodiments, the performing of the security action on the one or more network devices of the network may be further based on the forecasted future outside-in security features for the network. In some embodiments, the forecasting of the future inside-in security features and/or the future outside-in security features for the network using the CGLV model may include forecasting temporal variation profiles of the forecasted future inside-in security features and the forecasted future outside-in security features and/or forecasting relationships between the forecasted future inside-in security features and the forecasted future outside-in security features.

In some embodiments, the forecasted future inside-in security features and/or the forecasted future outside-in security features for the network may include a network device being attacked, a network device being infected with malicious software, and/or a network device having vulnerable software being installed thereon.

Also, in some embodiments, one or more non-transitory computer-readable media may include one or more computer-readable instructions that, when executed by one or more processors, cause the one or more processors to perform a method for securing network devices by forecasting future security incidents for a network based on past security incidents.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
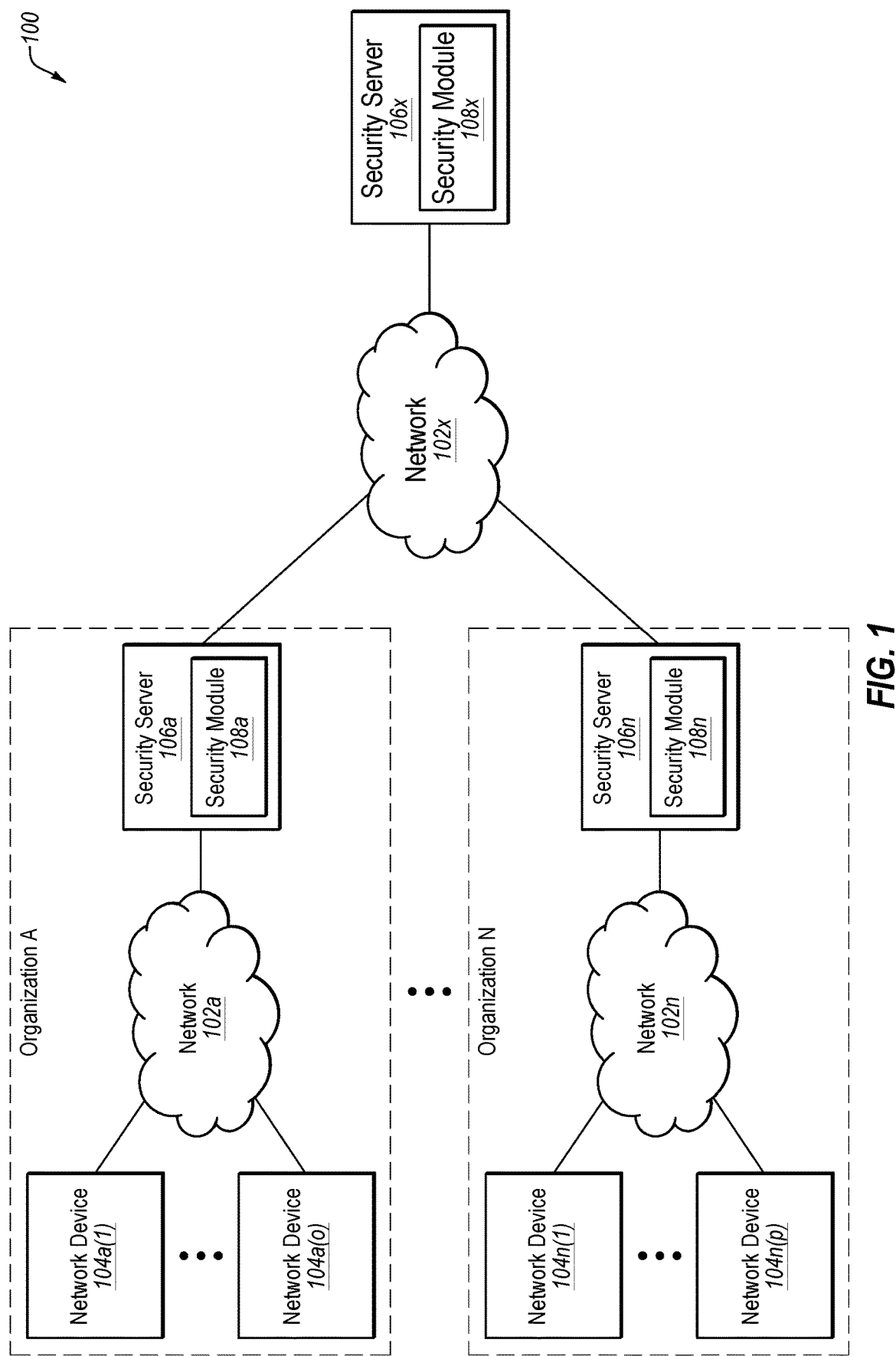
FIG. 1 illustrates an example system configured for securing network devices by forecasting future security incidents for a network based on past security incidents.

While it may be important to predict the likelihood of suffering future security incidents on an organization's network, such predicting may be difficult to accurately perform. Where accurate predictions of future security incidents on an organization's network are unavailable, it may be difficult to plan for and mitigate against future security incidents. For example, a cyber insurance carrier may wish to accurately predict the risk of future security incidents for each potential customer that it seeks to insure. However, where the cyber insurance carrier is unable to accurately predict future security incidents on a potential customer's network, it may be difficult for the cyber insurance carrier to evaluate quantitatively the risk of the potential customer's network being impacted by future security incidents, thereby making the providing of cyber insurance difficult or prohibitively expensive. In another example, network administrators of an organization's network may wish to accurately predict the risk of future security incidents on the organization's network in order to plan for and mitigate against future security incidents. However, where the network administrators are unable to accurately predict future security incidents on the organization's network, it may be difficult for the network administrators to plan for and mitigate against future security incidents, thereby exposing the organization's network to costly damage.

The embodiments disclosed herein may be employed in securing network devices by forecasting future security incidents for a network based on past security incidents. For example, some embodiments may enable future security incidents on an organization's network, in a near-term future or mid-term future, to be predicted based on the past security incidents on the organization's network.

In some embodiments, the past security incidents may be viewed from both inside-in and outside-in perspectives, and may be represented as past inside-in security features (security features are also referred to as telemetry data) and past outside-in security features for the network. Considering both the inside-in and outside-in perspectives may help increase the quality and coverage of the data used in the forecasting. Further, in some embodiments, dynamic time warping may be employed to generate a similarity score for each security feature pair in the past inside-in security features, in the past outside-in security features, and between the past inside-in security features and the past outside-in security features. These security scores may then form the basis for generating a Coupled Gaussian Latent Variable (CGLV) model, which may then be used to forecast future inside-in security features and/or future outside-in security features for the network. Finally, a security action may be performed on one or more network devices of the network based on the forecasted future inside-in security features and/or the forecasted future outside-in security features for the network.

The embodiments disclosed herein may enable more accurate prediction of future security incidents, which may enable future security incidents to be planned for and mitigated against. For example, where a cyber insurance carrier employs the embodiments disclosed herein to accurately predict future security incidents on a potential customer's network, it may be possible for the cyber insurance carrier to evaluate quantitatively the risk of the potential customer's network being impacted by future security incidents, thereby making the providing of cyber insurance less difficult and/or less costly. In another example, where network administrators of an organization employ the embodiments disclosed herein to accurately predict future security incidents on the organization's network, it may enable the network administrators to plan for and mitigate against future security incidents, thereby minimizing or preventing costly damage to the organization's network.

Turning to the figures, FIG. 1 illustrates an example system 100 configured for securing network devices by forecasting future security incidents for a network based on past security incidents. The system 100 may include systems internal to (or inside) organizations A-N along with systems external to (or outside) the organizations A-N. In particular, the system 100 may include: a network 102a, network devices 104a(1)-104a(o), and a security server 106a all internal to organization A; a network 102n, network devices 104n(1)-104n(p), and a security server 106n all internal to organization N; and a network 102x and a security server 106x both external to the organizations A-N.

In some embodiments, the network 102x may be configured to communicatively couple the systems of the organizations A-N to each other as well as to the security server 106x, as well as other similar systems and/or devices. Further, the network 102a may be configured to communicatively couple the network devices 104a(1)-104a(o) to one another as well as to the security server 106a. Similarly, the network 102n may be configured to communicatively couple the network devices 104n(1)-104n(p) to one another as well as to the security server 106n. In some embodiments, each of the networks 102a-102n and 102x may be any wired or wireless network, or combination of multiple networks, configured to send and receive communications between systems and devices. In some embodiments, each of the networks 102a-102n and 102x may include a Personal Area Network (PAN), a Local Area Network (LAN), a Metropolitan Area Network (MAN), a Wide Area Network (WAN), a Storage Area Network (SAN), or some combination thereof. In some embodiments, each of the networks 102a-102n and 102x may also be coupled to, or may include, portions of a telecommunications network, including telephone lines, for sending data in a variety of different communication protocols, such as a cellular network or a Voice over IP (VoIP) network.

Figure 4:
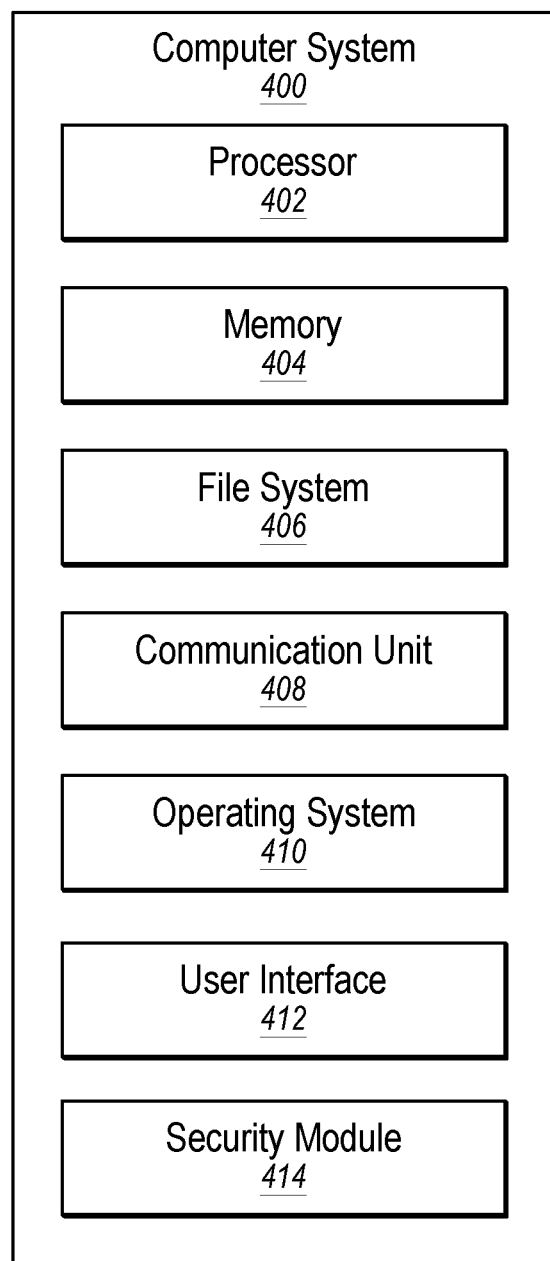
FIG. 4 illustrates an example computer system that may be employed in securing network devices by forecasting future security incidents for a network based on past security incidents.

In some embodiments, each of the network devices 104a(1)-104a(o) and 104n(1)-104n(p) may be any computer system, an example of which is disclosed herein in connection with the computer system 400 of FIG. 4.

In some embodiments, each of the security servers 106a-106n and 106x may be any computer system, an example of which is disclosed herein in connection with the computer system 400 of FIG. 4. In some embodiments, the security servers 106a-106n may be employed by the organizations A-N to internally monitor the networks 102a-102n and the network devices 104a(1)-104a(o) and 104n(1)-104n(p), while the security server 106x is employed to externally monitor the systems of the organizations A-N. In some embodiments, the security servers 106a-106n and 106x may include security modules 108a-108n and 108x, which may be configured to identify potential threats to the networks 102a-102n and/or the network devices 104a(1)-104a(o) and 104n(1)-104n(p) and perform security actions, as disclosed in greater detail in connection with FIGS. 2 and 3 herein. In some embodiments, the security modules 108a-108n and 108x may include, or have access to, training data and/or machine learning classifiers. In some embodiments, the security modules 108a-108n and 108x may include, or be part of, a User Behavior Analytics (UBA) application and/or a Security Information and Event Management (SIEM) application.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1.

Figure 2:
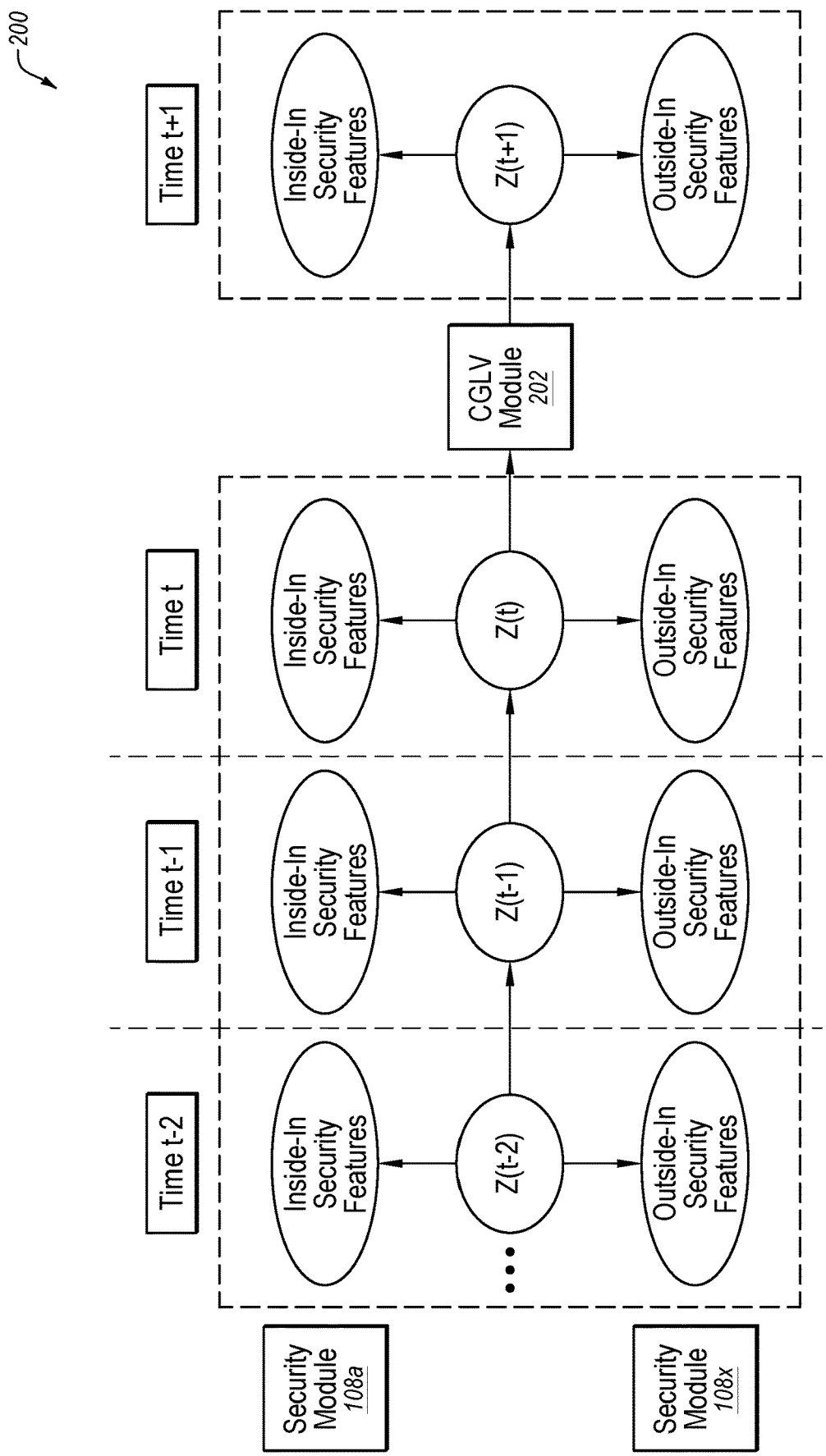
FIG. 2 is a flowchart of forecasting future security incidents for a network based on past security incidents.

FIG. 2 is a flowchart 200 of forecasting future security incidents for a network based on past security incidents. In particular, the flowchart 200 discloses forecasting future security features for the network 102a of the organization A of FIG. 1 using a Coupled Gaussian Latent Variable (CGLV) model 202 based on past security features.

As disclosed in the flowchart 200, the security module 108a may construct past inside-in security features for a network (such as the network 102a of FIG. 1) for times t−2, t−1, and t. The security module 108x may also construct past outside-in security features for the network for times t−2, t−1, and t. For convenience herein, a current time t is defined herein as a "past" time along with past times t−2 and t−1.

The security module 108x may then employ dynamic time warping to generate a similarity score for each security feature pair in the past inside-in security features, in the past outside-in security features, and between the past inside-in security features and the past outside-in security features. The security module 108x may then generate the CGLV model 202 based on the similarity scores. The security module 108x may then employ the CGLV model 202 to forecast future inside-in security features and/or future outside-in security features for time t+1 for the network. Then, the security module 108x may perform a security action on one or more network devices of the network (such as one or more of the network devices 104a(1)-104a(o) of the network 102a of FIG. 1) based on the forecasted future inside-in security features and/or forecasted future outside-in security features for time t+1 for the network.

In some embodiments, the inside-in and outside-in security features may relate to three categories of information, namely, attacks, infections, and vulnerabilities.

In some embodiments, information about attacks detected and stopped by an Anti-Virus (AV) engine may be obtained, along with their signatures and timestamps. This data may be grouped by organization, by time intervals (such as monthly, weekly, or daily time intervals), and by attack category. Then, for each grouping, security features may be generated as the total number of attacks and the total number of affected network devices.

In some embodiments, information about infections may be obtained, for example, by applying heuristics on the Symantec® IPS Submission support (IPS Ping) dataset. In some situations, network devices may install binary files that are only later marked as malicious due to their malicious network activity. This a posteriori information may be used to recognize infections after the fact. This data may then be grouped by organization, by time intervals, and by malware category. Then, for each grouping, security features may be generated as the total number of infections and the total number of infected network devices, plus average, median and maximum infection counts and durations.

In some embodiments, information about vulnerabilities may be obtained, for example, by analyzing a Symantec® MRCLEAN™ dataset by identifying "leading files" for some well-known applications (such as a file named "chrome.exe" and signed by Google™ representing Google™ Chrome™). The version information in the MRCLEAN™ dataset may then be checked against vulnerability information in a database, such as Symantec® DeepSight™ or the National Vulnerability Database (NVD), to obtain information about which network devices have software versions with known vulnerabilities, as well as the delay/lag in patching them, thus closing a "vulnerability window." This data may then be grouped by organization, by time intervals, and by vulnerability category. Then, for each grouping, security features may be generated as the number of network devices with patched and unpatched vulnerabilities, the mean of per-network device average and maximum Common Vulnerability Scoring System (CVSS) severity score of patched and unpatched vulnerabilities, and the mean of per-network device average and maximum length, in time, of vulnerability windows.

In some embodiments, the constructing of the past inside-in security features for the network 102a for times t−2, t−1, and t may be accomplished by monitoring network activity from inside the network 102a. For example, the security module 108a, which operates inside the network 102a, may monitor network activity of the network device 104a(1)-104a(o) from within the perimeter of the network 102a and the organization A to identify evidence of the presence of security incidents, such as a network device being attacked, a network device being infected with malicious software, and/or a network device having vulnerable software being installed thereon. Such inside-in introspection can be performed, for example, via the collection of security features provided by the various security applications such as AV pings, IPS pings, etc. In some embodiments, the constructing of the past inside-in security features for the network 102a may include: receiving as input a list of IP addresses (such as public or Internet-facing IP addresses of the organization A's network 102a); collecting passively monitored data from various data sources (such as the Spamhaus Project, a DNS-based Blackhole List (DNSBL), a Border Gateway Protocol (BGP) hijacks list, etc.); identifying "malicious" IP addresses of the organization A from the passively monitoring data; categorizing attacks, infections, or vulnerabilities in terms of the nature of data sources; and outputting security features relating to attacks, infections, or vulnerabilities for the organization A defined per time slot (such as the time slots represented by times t−2, t−1, and t).

In some embodiments, the constructing of the past outside-in (in contrast to inside-in) security features for the network 102a for times t−2, t−1, and t may be accomplished by monitoring network activity from outside the network 102a. For example, the security module 108x, which operates outside the network 102a, may monitor network activity of the network device 104a(1)-104a(o) externally to the perimeter of the network 102a and the organization A to identify evidence of the presence of security incidents. Such outside-in monitoring can be performed, for example, by monitoring the externally accessible "footprints" left by security incidents occurring inside the network 102a, such as a connection of an infected network device to a malware Command and Control (C&C) server, a misconfiguration of an Internet-facing network device, etc. In some embodiments, the constructing of the past outside-in security features for the network 102a may include: receiving as input a list of IP addresses (such as public or Internet-facing IP addresses of the organization A's network 102a); performing port scanning, banner grabbing, banner parsing, vulnerability database parsing, and banner and vulnerability matching; generating a list of vulnerabilities uncovered for each service/application running on each of the given IP addresses; and outputting security features relating to attacks, infections, or vulnerabilities for the organization A defined per time slot (such as the time slots represented by times t−2, t−1, and t).

In some embodiments, dynamic time warping to generate similarity scores may match time series of inside-in security features and outside-in security features. Similarity scores between each pair of the time series derived from the dynamic time warping may then be used to build the CGLV model 202. The dynamic time warping may be performed according to the following formula:

$$c_p(X, Y) := \sum_{l=1}^{L} c(x_{n_l}, y_{m_l})$$

In this formula, X and Y are two time series, $x_{n_l}$ and $y_{m_l}$ are the segments of the same length extracted from X and Y, respectively, each pair $x_{n_l}$ and $y_{m_l}$ are optimally matched under certain conditions and constraints, and c(*,*) is a distance function. In some embodiments, a time series may be simply defined as a temporal sequence of collected security incidents. For example, a time series may be illustrated as: Security Incident A-Security Incident B-Security Incident C-Security Incident B-Security Incident A. In general, the dynamic time warping may calculate an optimal match between two given sequences (e.g., time series) with certain restrictions. The sequences may be warped non-linearly in the time dimension to determine a measure of their similarity independent of certain non-linear variations in the time dimension. The formula above illustrates how the calculation in dynamic time warping may be performed. The dynamic time warping may be derived using the above formula by summing up the distance measurement between the optimally matched pairs.

The CGLV model 202 may both forecast temporal variation profiles of the future inside-in security features and the future outside-in security features for time t+1 and forecast relationships between the future inside-in security features and the future outside-in security features for time t+1. The CGLV model 202 may be defined as $H(\{x\_0 \ldots, x\_t\}, \{e\_0, \ldots e\_t\}, \{f\_0, \ldots f\_t\})$, where x_i is defined as a latent feature space that links the inside-in security features and the outside-in security features together. The output of H may be a temporal forecast of the inside-in security features $\{e\_\{t+1\}, e\_\{t+2\}, \ldots e\_\{t+m\}\}$, which corresponds to an estimate of security incident counts and/or vulnerability indicators that are most likely to be presented at a future time slot between t+1 and t+m. Thus, evaluation may be made of future security postures inside a given organization's network.

In some embodiments, the CGLV model 202 may include a dynamic interference process defined by the following two formulas:

$$P(f_t|z_t)=N(f_t|0,\alpha_w^{-1}z_t z_t^T+\theta^2 I)$$

$$P(z_{t+1}|z_t)=N(z_{t+1}|0,K^t)$$

The first formula may be used to define the functional mapping between the latent variables $z_t$, representing invisible internal security postures of a given organization and explicitly visible internal and/or external security incidents, denoted as $f_t$. In the first formula, $\alpha_w$ and $\theta$ are parameters improving degrees of freedom, attached to the covariance matrix of the normal conditional distribution of $f_t$, given $z_t$. The second formula may be used to define the temporal transition of internal security postures between successive time steps, such as how internal security postures vary from time t to time t+1, denoted as $z_t$ to $z_{t+1}$. In this second formula, $K^t$ is a time dependent kernel matrix, given by $$\alpha_1 \exp\left(-\frac{\alpha_2}{2}|x_t - x_{t+1}|^2\right) + \alpha_3 x_t x_{t+1} + \alpha_4.$$

The Gaussian process may assume that any two variables included in the stochastic process follow normal distribution. Without loss of generality, the CGLV model 202 may be centralized with 0 as the expectation. As can be seen from the first and second formulas above, both the observation model and the temporal transition model adopt the centralized normal distribution as the base model. The only difference lies in the design of a covariance matrix of the normal distribution. In the first formula, since we are aiming at describing relations between the latent variable z and the observable security posture f, the covariance matrix may be designed based on the Kronecker product of z. In the second formula, we employ a time-dependent kernel representing a temporal correlation between the latent variable z of time t and time t+1.

Modifications, additions, or omissions may be made to the example forecasting of future security incidents in the flowchart 200 of FIG. 2 without departing from the scope of the present disclosure. For example, although the flowchart 200 discloses forecasting future security features for the network 102a of the organization A of FIG. 1, similar components as those disclosed in FIG. 2 may be employed in forecasting future security features for the network 102n of the organization N of FIG. 1.

Figure 3:
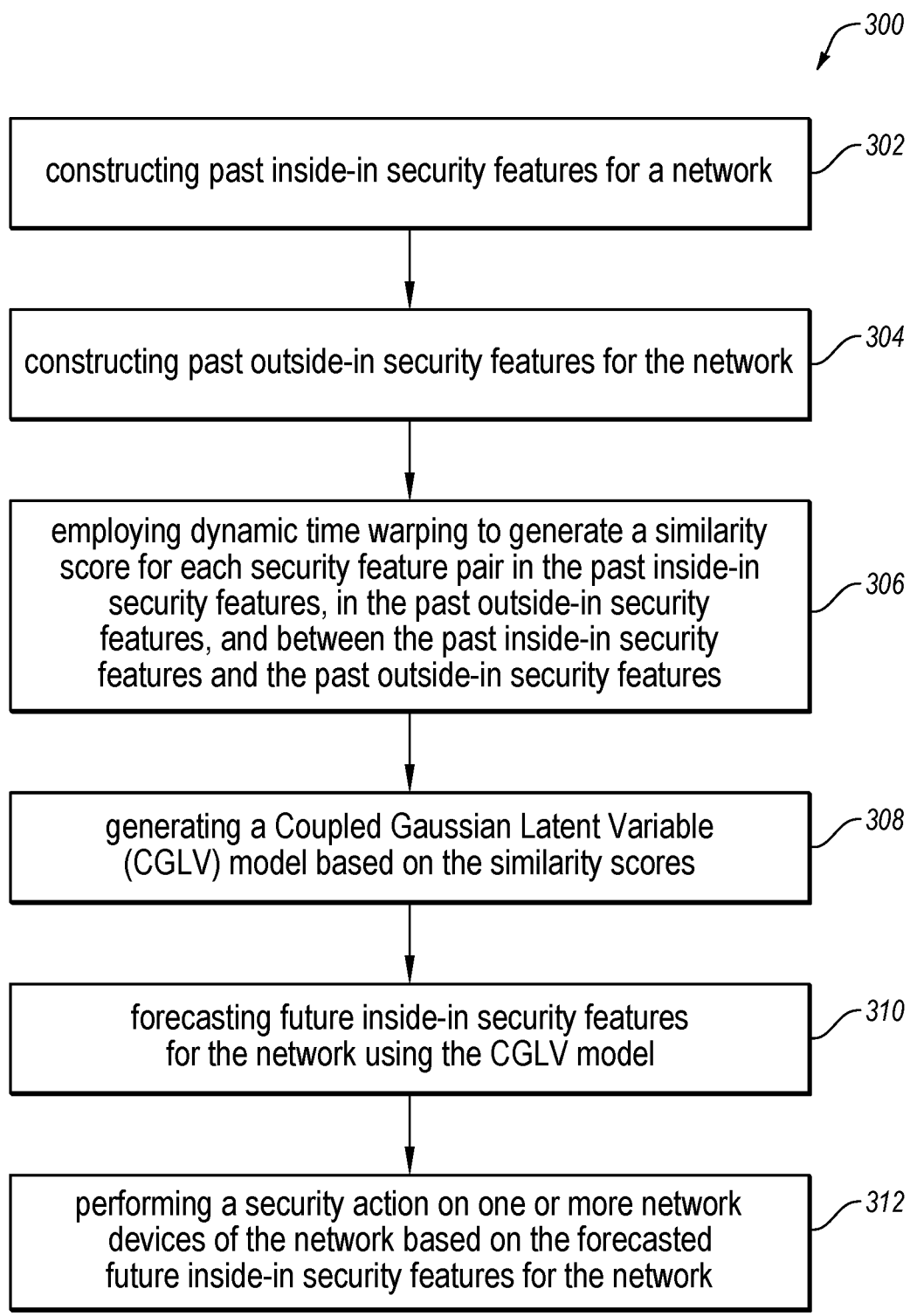
FIG. 3 is a flowchart of an example method for securing network devices by forecasting future security incidents for a network based on past security incidents.

FIG. 3 is a flowchart of an example method 300 for securing network devices by forecasting future security incidents for a network based on past security incidents. The method 300 may be performed, in some embodiments, by a device or system, such as by the security module 108a executing on the security server 106a and the security module 108x executing on the security server 106x of FIG. 1. In these and other embodiments, the method 300 may be performed by one or more processors based on one or more computer-readable instructions stored on one or more non-transitory computer-readable media. The method 300 will now be described in connection with FIGS. 1, 2, and 3.

The method 300 may include, at block 302, constructing past inside-in security features for a network. In some embodiments, the constructing of the past inside-in security features for the network may be accomplished by monitoring network activity from inside the network. For example, the security module 108a may construct, at block 302, past inside-in security features for the network 102a at times t−2, t−1, and t. The security module 108a may construct these past inside-in security features by monitoring network activity from inside the network 102a.

The method 300 may include, at block 304, constructing past outside-in security features for the network. In some embodiments, the constructing of the past outside-in security features for the network may be accomplished by monitoring network activity from outside the network. For example, the security module 108x may construct, at block 304, past outside-in security features for the network 102a at times t−2, t−1, and t. The security module 108x may construct these past outside-in security features by monitoring network activity from outside the network 102a.

The method 300 may include, at block 306, employing dynamic time warping to generate a similarity score for each security feature pair in the past inside-in security features, in the past outside-in security features, and between the past inside-in security features and the past outside-in security features. For example, the security module 108x may employ, at block 306, dynamic time warping to generate a similarity score for each security feature pair in the past inside-in security features from times t−2, t−1, and t, in the past outside-in security features from times t−2, t−1, and t, and between the past inside-in security features and the past outside-in security features from times t−2, t−1, and t.

The method 300 may include, at block 308, generating a Coupled Gaussian Latent Variable (CGLV) model based on the similarity scores. For example, the security module 108x may generate, at block 308, the CGLV model 202 based on the similarity scores generated at block 306.

The method 300 may include, at block 310, forecasting future inside-in security features for the network using the CGLV model. In some embodiments, the forecasting of the future inside-in security features for the network using the CGLV model may further include forecasting future outside-in security features for the network using the CGLV model.

In some embodiments, the forecasting of the future inside-in security features and/or the future outside-in security features for the network using the CGLV model may include forecasting temporal variation profiles of the forecasted future inside-in security features and the forecasted future outside-in security features and/or forecasting relationships between the forecasted future inside-in security features and the forecasted future outside-in security features. For example, the security module 108x may forecast, at block 310, the future inside-in security features and/or the future outside-in security features for the network for time t+1 using the CGLV model 202. This forecasting at block 310 may include the security module 108x forecasting temporal variation profiles of the forecasted future inside-in security features and the forecasted future outside-in security features for time t+1 and/or forecasting relationships between the forecasted future inside-in security features and the forecasted future outside-in security features for time t+1.

In some embodiments, the forecasted future inside-in security features and/or the forecasted future outside-in security features for the network that are forecasted at block 310 may include a network device being attacked, a network device being infected with malicious software, and/or a network device having vulnerable software being installed thereon. For example, the forecasted future inside-in security features and/or the forecasted future outside-in security features for the network for time t+1 that are forecasted at block 310 may include one of the network devices 104a(1)-104a(o) being attacked, one of the network devices 104a(1)-104a(o) being infected with malicious software, and/or one of the network devices 104a(1)-104a(o) having vulnerable software being installed thereon.

The method 300 may include, at block 312, performing a security action on one or more network devices of the network based on the forecasted future inside-in security features for the network. In some embodiments, the performing of the security action on the one or more network devices of the network may be further based on the forecasted future outside-in security features for the network. For example, the security module 108x may perform, at block 312, a security action on one or more of the network devices 104a(1)-104a(o) of the network 102a based on the forecasted future inside-in security features for the network 102a for time t+1.

In some embodiments, the performing of the security action at block 312 may include preventing the network device from being attacked, preventing the network device from being infected with malicious software, and/or preventing the network device from having vulnerable software being installed thereon. For example, the security action performed by the security module 108x at block 312 may include the security module 108x preventing one of the network devices 104a(1)-104a(o) from being attacked, preventing one of the network devices 104a(1)-104a(o) from being infected with malicious software, and/or preventing one of the network devices 104a(1)-104a(o) from having vulnerable software being installed thereon.

The method 300 may thus be employed, in some embodiments, to secure the network devices 104a(1)-104a(o) of the network 102a by forecasting future inside-in and/or outside-in security features for time t+1 for the network 102a based on past inside-in and outside-in security features for times t−2, t−1, and t. Some embodiments of the method 300 may enable more accurate prediction of future security incidents, which may enable forecasted future security incidents to be planned for and mitigated against. For example, where a cyber insurance carrier employs the method 300 to accurately predict future security incidents on organization A's network 102a, it may be possible for the cyber insurance carrier to evaluate quantitatively the risk of organization A's network 102a being impacted by forecasted future security incidents, thereby making the providing of cyber insurance to organization A less difficult and/or less costly. In another example, where network administrators employ the method 300 to accurately predict future security incidents on organization A's network 102a, it may enable the network administrators to plan for and mitigate against forecasted future security incidents, thereby minimizing or preventing costly damage to organization A's network 102a.

Although the blocks of the method 300 are illustrated in FIG. 3 as discrete blocks, various blocks may be divided into additional blocks, combined into fewer blocks, reordered, expanded, or eliminated, depending on the desired implementation. For example, in some embodiments, blocks 302-310 may be performed without performing block 312. Also, in some embodiments, block 312 may be performed by a network administrator or other entity that is different from the entity performing the other blocks of the method 300. Further, in some embodiments, blocks 302-310 may be performed in parallel with the performance of block 312.

Further, it is understood that the method 300 may improve the functioning of a network environment. For example, the functioning of the security server 106a or any of the network devices 104a(1)-104a(o) of FIG. 1 may itself be improved by the method 300. For example, any of these computer systems may be improved by forecasting future security incidents for the network 102a using the CGLV model 202 based on past security incidents. The method 300 may thus result in the securing of network devices in a network in a more effective manner than conventional methods which are unable to accurately predict future security incidents on a network.

Also, the method 300 may improve the technical field of detecting and securing compromised network devices. Employing inside-in security features, outside-in security features, dynamic time warping, and a CGLV model in the forecasting of future security incidents on a network is an improvement over conventional methods which do not employ this combination of data and techniques and are therefore less accurate at predicting future security incidents.

FIG. 4 illustrates an example computer system 400 that may be employed in securing compromised network devices in a network. In some embodiments, the computer system 400 may be part of any of the systems or devices described in this disclosure. For example, the computer system 400 may be part of any of the network devices or the security server devices of FIG. 1.

FIG. 4 illustrates an example computer system 400 that may be employed in securing network devices by forecasting future security incidents for a network based on past security incidents. In some embodiments, the computer system 400 may be part of any of the systems or devices described in this disclosure. For example, the computer system 400 may be part of any of the network devices or the security servers of FIG. 1.

The computer system 400 may include a processor 402, a memory 404, a file system 406, a communication unit 408, an operating system 410, a user interface 412, and a security module 414, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more blocks of the method 300 of FIG. 3.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more blocks of the method 300 of FIG. 3. These computer-executable instructions may be included, for example, in the operating system 410, in one or more applications, such as the security module 414, or in some combination thereof.

The communication unit 408 may include any component, device, system, or combination thereof configured to transmit or receive information over a network, such as any of the networks 102a-102n and 102x of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The security module 414 may be one or more computer-readable instructions stored on one or more non-transitory computer-readable media, such as the memory 404 or the file system 406, that, when executed by the processor 402, is configured to perform one or more blocks of the method 300 of FIG. 3. In some embodiments, the security module 414 may be part of the operating system 410 or may be part of an application of the computer system 400, or may be some combination thereof. In some embodiments, the security module 414 may function as any of the security modules 108a-108n and 108x of FIG. 1.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software modules, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for securing network devices by forecasting future security incidents for a network based on past security incidents, at least a portion of the method being performed by a computing device comprising at least one processor, the method comprising:
   constructing past inside-in security features for a network;
   constructing past outside-in security features for the network;
   employing dynamic time warping to generate a similarity score for each security feature pair in the past inside-in security features, in the past outside-in security features, and between the past inside-in security features and the past outside-in security features;
   generating a Coupled Gaussian Latent Variable (CGLV) model based on the similarity scores;
   forecasting future inside-in security features for the network using the CGLV model; and
   performing a security action on one or more network devices of the network based on the forecasted future inside-in security features for the network.

2. The method of claim 1, wherein:
   the constructing of the past inside-in security features for the network is accomplished by monitoring network activity from inside the network; and
   the constructing of the past outside-in security features for the network is accomplished by monitoring network activity from outside the network.

3. The method of claim 1, wherein:
   the forecasted future inside-in security features for the network comprise a network device being attacked; and
   the performing of the security action comprises preventing the network device from being attacked.

4. The method of claim 1, wherein:
   the forecasted future inside-in security features for the network comprise a network device being infected with malicious software; and
   the performing of the security action comprises preventing the network device from being infected with malicious software.

5. The method of claim 1, wherein:
   the forecasted future inside-in security features for the network comprise a network device having vulnerable software being installed thereon; and
   the performing of the security action comprises preventing the network device from having vulnerable software being installed thereon.

6. The method of claim 1, wherein the forecasting of the future inside-in security features for the network using the CGLV model comprises forecasting temporal variation profiles of the forecasted future inside-in security features for the network.

7. A computer-implemented method for securing network devices by forecasting future security incidents for a network based on past security incidents, at least a portion of the method being performed by a computing device comprising at least one processor, the method comprising:
   constructing past inside-in security features for a network;
   constructing past outside-in security features for the network;
   employing dynamic time warping to generate a similarity score for each security feature pair in the past inside-in security features, in the past outside-in security features, and between the past inside-in security features and the past outside-in security features;
   generating a Coupled Gaussian Latent Variable (CGLV) model based on the similarity scores;
   forecasting future inside-in security features for the network and future outside-in security features for the network using the CGLV model; and
   performing a security action on one or more network devices of the network based on the forecasted future inside-in security features for the network and the forecasted future outside-in security features for the network.

8. The method of claim 7, wherein:
the constructing of the past inside-in security features for the network is accomplished by monitoring network activity from inside the network; and
the constructing of the past outside-in security features for the network is accomplished by monitoring network activity from outside the network.

9. The method of claim 7, wherein:
the forecasted future inside-in security features for the network and the forecasted future outside-in security features for the network comprise a network device being attacked; and
the performing of the security action comprises preventing the network device from being attacked.

10. The method of claim 7, wherein:
the forecasted future inside-in security features for the network and the forecasted future outside-in security features for the network comprise a network device being infected with malicious software; and
the performing of the security action comprises preventing the network device from being infected with malicious software.

11. The method of claim 7, wherein:
the forecasted future inside-in security features for the network and the forecasted future outside-in security features for the network comprise a network device having vulnerable software being installed thereon; and
the performing of the security action comprises preventing the network device from having vulnerable software being installed thereon.

12. The method of claim 7, wherein the forecasting of the future inside-in security features for the network and the future outside-in security features for the network using the CGLV model comprises forecasting temporal variation profiles of the forecasted future inside-in security features for the network and the forecasted future outside-in security features for the network.

13. The method of claim 7, wherein the forecasting of the future inside-in security features for the network and the future outside-in security features for the network using the CGLV model comprises forecasting relationships between the forecasted future inside-in security features for the network and the forecasted future outside-in security features for the network.

14. One or more non-transitory computer-readable media comprising one or more computer-readable instructions that, when executed by one or more processors of one or more computing devices, cause the one or more computing devices to perform a method for securing network devices by forecasting future security incidents for a network based on past security incidents, the method comprising:
   constructing past inside-in security features for a network;
   constructing past outside-in security features for the network;
   employing dynamic time warping to generate a similarity score for each security feature pair in the past inside-in security features, in the past outside-in security features, and between the past inside-in security features and the past outside-in security features;
   generating a Coupled Gaussian Latent Variable (CGLV) model based on the similarity scores;
   forecasting future inside-in security features for the network using the CGLV model; and
   performing a security action on one or more network devices of the network based on the forecasted future inside-in security features for the network.

15. The one or more non-transitory computer-readable media of claim 14, wherein:
the constructing of the past inside-in security features for the network is accomplished by monitoring network activity from inside the network; and
the constructing of the past outside-in security features for the network is accomplished by monitoring network activity from outside the network.

16. The one or more non-transitory computer-readable media of claim 14, wherein:
the forecasted future inside-in security features for the network comprise a network device being attacked; and
the performing of the security action comprises preventing the network device from being attacked.

17. The one or more non-transitory computer-readable media of claim 14, wherein:
the forecasted future inside-in security features for the network comprise a network device being infected with malicious software; and
the performing of the security action comprises preventing the network device from being infected with malicious software.

18. The one or more non-transitory computer-readable media of claim 14, wherein:
the forecasted future inside-in security features for the network comprise a network device having vulnerable software being installed thereon; and
the performing of the security action comprises preventing the network device from having vulnerable software being installed thereon.

19. The one or more non-transitory computer-readable media of claim 14, wherein the forecasting of the future inside-in security features for the network using the CGLV model further comprises forecasting future outside-in security features for the network using the CGLV model.

20. The one or more non-transitory computer-readable media of claim 19, wherein the forecasting of the future inside-in security features for the network and the future outside-in security features for the network using the CGLV model comprises:
   forecasting temporal variation profiles of the forecasted future inside-in security features for the network and the forecasted future outside-in security features for the network; and
   forecasting relationships between the forecasted future inside-in security features for the network and the forecasted future outside-in security features for the network.

* * * * *